Patented Aug. 16, 1932

1,871,950

UNITED STATES PATENT OFFICE

JÜRGEN CALLSEN, OF ELBERFELD, NEAR COLOGNE-ON-THE RHINE, GERMANY, ASSIGNOR TO WINTHROP CHEMICAL COMPANY, INC., OF NEW YORK, N. Y.

THE TRICHLORO ETHYL URETHANE SALT OF 4-DIMETHYL AMINO-1-PHENYL-2.3-DIMETHYL PYRAZOLONE

No Drawing. Application filed January 30, 1926, Serial No. 85,052, and in Germany April 23, 1925.

The present invention concerns new homogeneous compounds from the esters of halogenated aliphatic alcohols with carbamic acid and 1-phenyl-2.3-dimethyl-4-dimethylamino-5-pyrazolone which may be represented by the probable general formula:

$$H_3C-C=C-N(CH_3)_2$$
$$H_3C-N \quad C=O-H_2N-CO-O-R,$$
$$\underset{C_6H_5}{N}$$

wherein R is a halogenated alkyl radical. The new compounds are obtainable by causing these components to interact with each other in molecular quantities. The reaction may take place, for example, by melting the components together or by mixing their solutions and evaporating or allowing the same to crystallize. In this manner crystalline compounds are obtained, which can be recrystallized without decomposition, for example, from ligroin, giving crystals which possess a sharp melting point. The new products have proved themselves to be valuable analgetica.

The following examples will serve to illustrate my invention:

*Example 1.*—231 parts by weight of 4-dimethylamino-1-phenyl-2.3-dimethyl-pyrazolone are mixed with 192 parts by weight of trichloroethylurethane and the whole is melted on the water bath with gentle heating. The solidified crystalline mass obtained on cooling is either ground or recrystallized from hot ligroin. The resulting product is an almost colorless crystalline powder possessing a slightly bitter taste. It is easily soluble in acetone, alcohol and benzene, less easily soluble in ligroin and only slightly soluble in petrol ether. The melting point was found to lie between 75° C. and 76° C.

The product is an equimolecular compound of the trichloroethylurethane

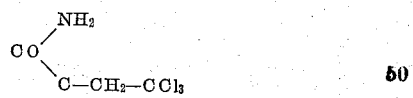

with 4-dimethylamino-1-phenyl-2.3-dimethylpyrazolone

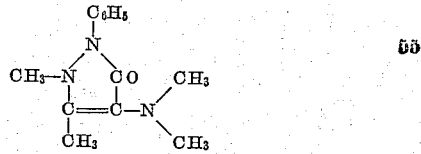

It has the formula:

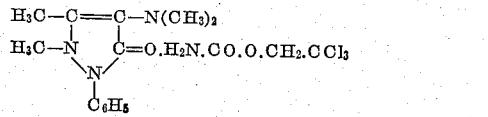

*Example 2.*—462 grams of 4-dimethylamino-1-phenyl-2.3-dimethyl-pyrazolone are dissolved together with 385 grams of trichloroethylurethane in 500 ccs. of ligroin with gentle warming. On cooling the compound described in Example 1 separates out.

I claim:

As a new product a compound of the probable formula:

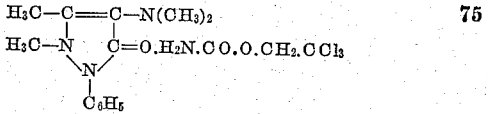

being a colorless crystalline powder, easily soluble in acetone, alcohol and benzene, less easily soluble in ligroin, having a melting point of about 75–76° C. and having valuable analgesic properties.

In testimony whereof I have hereunto set my hand.

JÜRGEN CALLSEN.